United States Patent [19]

Erickson et al.

[11] 4,342,650

[45] * Aug. 3, 1982

[54] ORGANIC SLUDGE-ENERGY RECYCLING METHOD

[76] Inventors: Lennart G. Erickson, 1070 E. Meadow Cir., Palo Alto, Calif. 94303; Howard E. Worne, Lynon Industrial Park, Rte. 73, Berlin, N.J. 08009

[ * ] Notice: The portion of the term of this patent subsequent to May 12, 1998, has been disclaimed.

[21] Appl. No.: 203,723

[22] Filed: Nov. 3, 1980

Related U.S. Application Data

[63] Continuation-in-part of Ser. No. 52,644, Jun. 27, 1979, Pat. No. 4,267,049, which is a continuation-in-part of Ser. No. 877,195, Feb. 13, 1978, Pat. No. 4,159,944.

[51] Int. Cl.³ ............................................. C02F 3/34
[52] U.S. Cl. .................................... 210/606; 210/609; 210/613; 210/631; 210/632; 210/912; 71/13
[58] Field of Search ............... 210/606, 609, 613, 631, 210/632, 912, 602, 688, 731, 170, 747; 435/253, 804; 71/12–14

[56] References Cited

U.S. PATENT DOCUMENTS

| | | | |
|---|---|---|---|
| 3,955,318 | 5/1976 | Hulls | 210/602 |
| 4,005,546 | 2/1977 | Oswald | 210/602 |
| 4,041,182 | 8/1977 | Erickson et al. | 435/804 |
| 4,159,944 | 7/1979 | Erickson et al. | 210/626 |
| 4,209,388 | 6/1980 | De Fraites | 210/602 |
| 4,267,049 | 5/1981 | Erickson et al. | 210/606 |

*Primary Examiner*—Benoit Castel
*Attorney, Agent, or Firm*—Townsend and Townsend

[57] ABSTRACT

A method is described for converting substantially untreated organic sludge into useful substances. The sludge may include primary sludge, a mixture of primary and secondary sludges from municipal wastewater treatment facilities, slurries of agricultural manure, and other organic wastes. The sludge is mechanically comminuted to reduce the size of organic solids, the sludge is then further mechanically disintegrated and thereafter it is subjected to enzyme hydrolysis to produce a biologically stable colloidal slurry with improved biochemical potential reactivity. Typically, the hydrolysis step is followed by a further cell/particle disintegration step and a secondary hydrolysis step. If necessary, heavy metals are removed from the suspension in a chelating step which are recovered as a recyclable concentrate. The suspension can be used as a liquid fertilizer or it can be dewatered. If used as a liquid fertilizer the suspension can be inoculated with microalgae to enrich the fertilizer with nitrogen. Alternatively, the demineralized product may be incinerated or used as a feedstock for other industrial processing.

38 Claims, 2 Drawing Figures

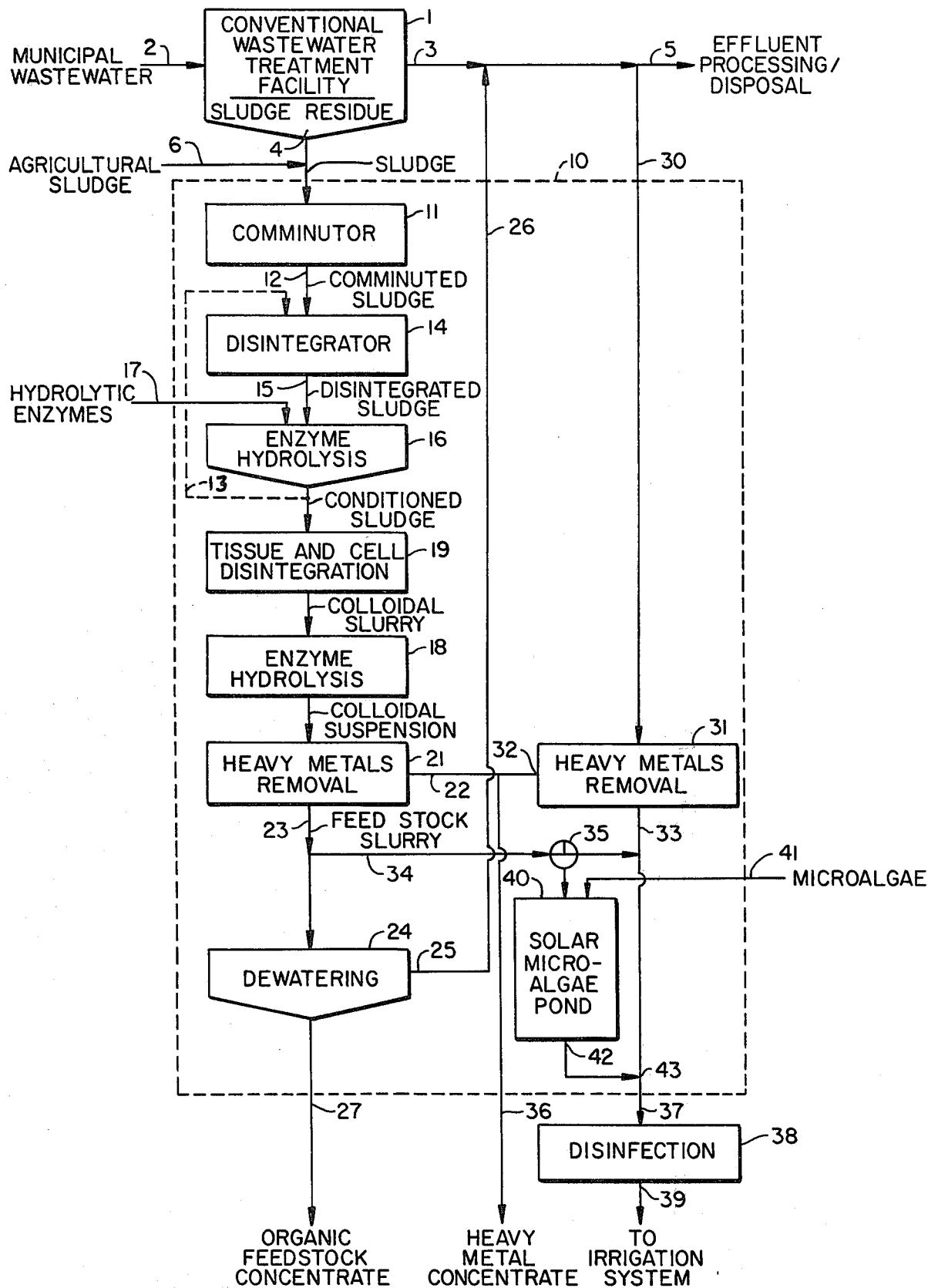
FIG._1.

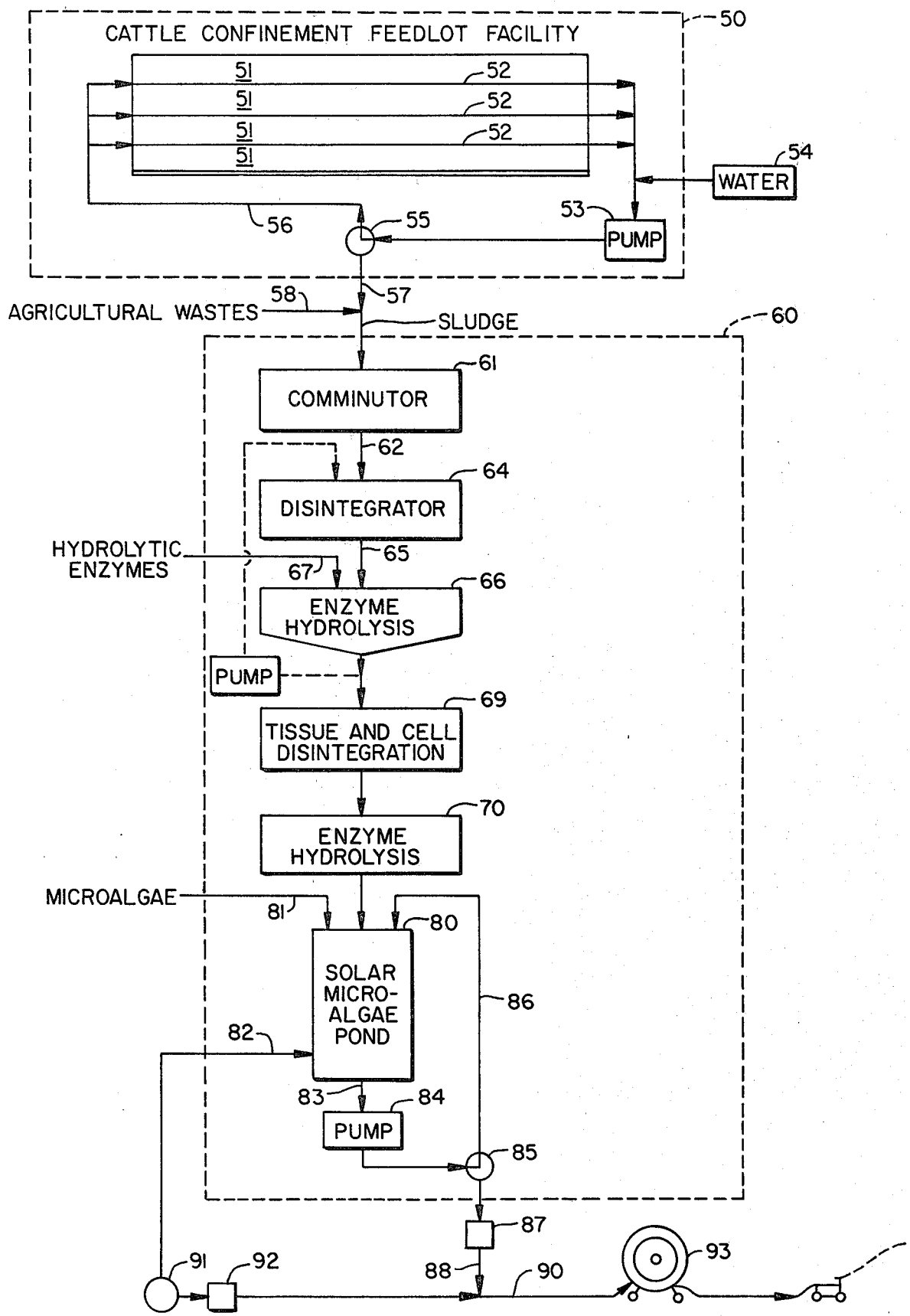
FIG._2.

4,342,650

ORGANIC SLUDGE-ENERGY RECYCLING METHOD

RELATED APPLICATION

This is a continuation-in-part application of our co-pending patent application entitled BIOLOGICAL SLUDGE-ENERGY RECYCLING METHOD, bearing Ser. No. 52,644 and filed on June 27, 1979 now U.S. Pat. No. 4,267,049, which is a continuation-in-part application of Ser. No. 877,195 filed Feb. 13, 1978, and now U.S. Pat. No. 4,159,944.

BACKGROUND OF THE INVENTION

The following reference publications are of interest in regard to the present invention, a method for processing organic sludges.

"Land Disposal—What's the Realistic View", June, 1974, by authors H. L. Michel, P. H. Gilbert, and H. K. Creed, published in *Water and Wastes Engineering*, June, 1974; "Utilization of Animal Manures and Sewage Sludges in Food and Fiber Production", Report 41, February, 1975; and "Application of Sewage Sludge to Croplands; Appraisals of Potential Hazards of Heavy Metals to Plants and Animals", Report No. 64, November, 1976, both published by the Council for Agricultural Science and Technology (CAST), Iowa State University; and, in regard to prior art solar ponds, "Energy Production by Microbial Photosynthesis", John R. Benemann, et al. *Nature*, Vol. 268, No. 5615, pp 19–23, July 7, 1977.

The potential for the recovery of resource values from sludge from conventional sewage treatment facilities is evident from the data published. Expressed in volumes per 100,000 persons, the average dryweight volume of sludge produced is about 11.5 tons per day containing about 65% organic solids of potential value as fuel or as agricultural fertilizer and soil amendment materials.

The PBQ&D, Inc., and CAST studies referred to above also provide data as to the substantial amounts of heavy metals in sewage sludges. For example, the following concentrations are noted:

| Element | Range mg/kg - dry weight basis |
|---|---|
| Zinc | 500 to 50,000 |
| Copper | 250 to 17,000 |
| Nickel | 25 to 8,000 |
| Cadmium | 5 to 2,000 |

The potentials for resource recovery and recycling of metal values is of special interest. U.S. Geological Survey Circular 784 (1978) describes a special situation in which gold and silver are present in sewage sludge incinerator ash in quantitites providing incentives for special treatment to recover precision metals.

Land disposal of primary and mixed sludge is currently practiced, but is costly as most of the total weight is water and the potentials for heavy metals pollution require sometimes costly mitigating measures. Incineration is difficult because of the water content and it is costly due to supplemental fuel usually required to support combustion. Discharge of sludge into public waterways and the oceans is not an acceptable alternative in the opinion of many environmental experts.

The PBQ&D, Inc. reference study also documents the presence of substantial amounts of heavy metal residuals in treated wastewater effluents. The presence of such toxins limits the use of such effluents for agricultural irrigation. A tertiary treatment is often required prior to discharge to public waterways.

SUMMARY OF THE INVENTION

This invention relates to an improved method for converting raw organic wastes, such as wastewater treatment plant sludge or agricultural manures, into an improved demineralized organic feedstock for industrial uses or for agricultural fertilizers which are optionally enriched with microalgae.

Broadly speaking, the present invention provides a method for converting substantially untreated organic sludges, as hereinafter described, into useful products by hydrolyzing the organic substances in the sludge. A major proportion, and normally substantially all, of the organic materials in the sludge are disintegrated into a colloidal suspension from which most of the content of heavy metals can be economically separated. The resultant product is well suited to relatively rapid metabolization by cultured or soil micro-organisms and plant life. The product may be readily dewatered to reduce moisture content more economically than was heretofore feasible.

More specifically, the present invention contemplates to normally hydrolyze, in three stages, the organic solids in substantially untreated organic sludges such as primary sludge from municipal wastewater treatment facilities, slurries of agricultural manure, or similar organic wastes. The organic solids in such sludge are sequentially reduced in particulate size by first step mechanical comminution followed by second step mechanical disintegration and third step enzymatic hydrolysis, thus to produce a suspension in which substantially all particulate matter is in colloidal form.

Primary sludge and mixtures of primary sludge with biologically processed secondary or digestor sludge include a substantial proportion of cellular components in their natural durable, compliant form. A proportion of such cells may pass undamaged through the mechanical disintegrator into the hydrolyzing enzyme reactor where the structural integrity of such cells is subsequently degraded by action of the enzymes. Normally, but not necessarily, the slurries discharged from the hydrolyzing reactor include such enzyme conditioned cells in which event the slurries are cycled through another, second mechanical disintegrator where they are ruptured to discharge the cellular components into solution and thereby form a colloidal slurry. The latter is then fed to a second enzyme hydrolysis reactor where the polysaccharide gel content is hydrolyzed and the abovementioned colloidal suspension is formed.

Most municipal sludges include a contaminating proportion of heavy metals, in which case the present invention provides for efficient separation of heavy metals from the colloidal slurry, by means of a chelation process. The separated heavy metals may be refined to recover such mineral resource values as cadmium, copper, nickel, zinc, and, in special situations, precious metals such as gold and silver.

The resultant organic feedstock product of our invention is biologically stable and has improved biochemical reactivity potentials as the solids are readily available in solution or in colloidal suspension.

This product includes low molecular weight fertilizer nutrients in a form well suited for relatively rapid utilization by agricultural micro-organisms and plant life.

Optionally, this nutrient product may be inoculated with microscopic, aquatic plants such as microalgae and photosynthetic bacteria and is then cultured in water in solar ponds to convert solar radiation, atmospheric nitrogen and carbon dioxide into additional fertilizer nutrients. The treated effluent discharged from modern waste water treatment facilities may be used as irrigation water after chelation treatment to remove heavy metals according to the method of our invention and can then be combined with the suspension, irrespective of whether or not the latter was subjected to the microalgae treatment.

Alternatively, the colloidal suspension product of our invention may be efficiently dewatered, as the water retention capacity of cells and polysaccharides, characteristic of organic sludges, has been greatly reduced due to disintegration of these components in accordance with our invention. This demineralized, dewatered product is well suited for use as agricultural fertilizer or a feedstock for additional processing, not a part of this invention, into fuels or other products. It is also well suited for incineration and disposal because of its reduced potential for environmental pollution.

In the above summarized method, substantial values and utility may be added to such raw materials as wastewater sludges, effluents and livestock manures. Recycled to land or to other useful purposes, the products of our invention effectively conserve energy resources conventionally required for production of equivalents. Such recycling reduces the environmental pollution and energy consumption now resulting from processing such organic materials to disposal as wastes.

Our U.S. Pat. No. 4,159,944 describes an alternative method for processing municipal primary sludge into biologically treated secondary sludge and an effluent suitable for rupture of the sludge cellular structure and chelation removal of heavy metals, thus to produce irrigation water with dilute organic fertilizer in solution and colloidal suspension.

Our referenced U.S. patent describes a method for processing treated cellular biomass materials into concentrate feedstock, fertilizer and feed products including hydrolytic enzyme conditioning to facilitate disintegration of cell and tissue structure and subsequent chelation removal of heavy metals.

Neither of the above disclosures discloses or suggests the method of the present invention by which substantially untreated, organic sludges can be processed into a demineralized, hydrolyzed colloidal suspension or feedstock. According to the prior art, such a suspension requires an initial biological treatment of the sludge such as an aerobic treatment lasting for about six hours. In such treatment, bacteria produce a large mass of cells, a biomass sludge, which can then be treated as disclosed in our above-referenced patent. In contrast thereto, the present invention eliminates the need for the initial biological treatment of the sludge. This results in significant time and cost savings both in terms of the initial investment in the plant and its subsequent operating costs.

Our U.S. Pat. No. 4,041,182 describes a method for enzyme hydrolysis of raw organic wastes to a separated cellulosic byproduct and a nutrient solution used in synthesis of a single cell protein feed biomass product. This is suitable for use as input raw material, in the method of our above-referenced patent, for production of feed supplement concentrates.

Therefore, a major objective of the present invention is to provide improved methodology for recycling sewage sludge and mixed sludges to recover the potential raw material values therein, in the form of useful commercial products.

A major objective of this invention is to provide improved methodology for the enhancement of fertilizer values and effectiveness of manures and other agricultural wastes.

A further major objective of this invention is to recover energy equivalent to the energy that would otherwise be required for production and delivery of the corresponding volumes of fertilizer, feedstock concentrates, and heavy metals comprising the major products produced by the method and process of our invention.

Other major objectives of this invention are to reduce the environmental damage inherent in current practices of disposal of sewage sludges as landfill, by sea dumping, incineration, and other methods of disposal and to conserve the energy and other resources now expended in the processes of such disposal.

An objective of this invention is to destroy the cell structure and viability of micro-organisms often present in primary or mixed organic sludges including bacteria, fungi, algae, protozoa, rotifers, eggs, worms, seeds, and other biological and plant life forms.

An objective of this invention is to provide improved means for disintegrating the cell and tissue structure of organic sludge solids, thus to facilitate efficient sterilization with relatively reduced requirements for chemical and other sterilization agents.

An objective of this invention is to provide improved means for disintegrating the cell and tissue structure of organic sludge solids, thus to facilitate efficient dewatering.

An objective of this invention is to provide means for the disintegration and hydrolysis of the cell and tissue structure of organic sludge solids, thus to facilitate separation of heavy metals.

An objective of this invention is to provide improved fertilizer products in which the structure of tissue and cellular components has been disintegrated, thus making available to soil micro-organisms and plant life the readily utilizable low molecular weight nutrient components.

An objective of this invention is to provide improved means for the preparation of a hydrolyzed nutrient solution for agricultural production of algae or other hydroponic plants.

An objective of this invention is to provide a dewatered, demineralized, low molecular weight organic intermediate feedstock well suited to further processing into fuel products.

Definitions

For purposes of this patent application and unless otherwise indicated, the following terms used herein are meant to have the meaning indicated below.

The term "municipal wastewater" refers primarily to the raw sewage waste water acceptable as influent to conventional sewage treatment facilities.

The term "primary sludge" refers to sludge recovered by sedimentary settling in conventional sewage treatment facilities. Typically, such primary sludge has a solids content of 2 to 7% and includes a substantial proportion of the heavy metals present in the municipal wastewater influent.

The term "secondary sludge" refers to the predominantly organic cellular biomass sludge residue from all known biological methods for treatment of wastewaters and aqueous slurries of biodegradable organic materials, wherein microbial reactions are used to purify the wastewater stream by reduction of biodegradable and putrifactive components to a relatively stable, separated treated sludge residue or biomass of predominantly cellular structure. Well-known examples of such processing include activated sludge and extended aerobic treatments and anaerobic digestor treatment. The solids content of such secondary sludges ranges from 1 to 2% for activated sludge and 6 to 12% for digester sludge, including a substantial proportion of the heavy metals present in the municipal wastewater influent.

The term "treated effluent" refers to the fluid discharged from conventional sewage treatment facilities typically including a substantial proportion of the heavy metals present in the municipal waste water influent in the form of soluble salts and colloidal particulate matter.

The term "agricultural sludge" refers primarily to slurries including livestock manures and residues from fruit, vegetable, and animal packing operations and from field crop and tree farm operations.

The term "substantially untreated organic sludge" refers generally to primary sludge or agricultural sludge, to combinations thereof, as well as to mixtures thereof with secondary sludge, and is sometimes hereinafter referred to as "sludge".

The term "heavy metals" refers to such metals as cadmium, chromium, copper, iron, lead, nickel, manganese, and zinc often present in waste waters, and also to gold, silver, and other metals present in special situations.

The term "microalgae" includes all forms of microscopic aquatic plants including mixtures of Green and Bluegreen Algae, preferably uni-cellular non-filamentous noncolonial types, to which photosynthetic bacteria may also be added.

BRIEF DESCRIPTION OF THE DRAWINGS

FIG. 1 is a flow diagram which illustrates the method of our invention primarily in regard to the processing of municipal sewage wastewaters.

FIG. 2 is a flow diagram which illustrates the method of our invention primarily in regard to the processing of manure from a cattle feedlot.

DESCRIPTION OF THE PREFERRED EMBODIMENTS

Referring to FIG. 1, there is indicated at 1 all known wastewater treatment methods for reducing municipal watewaters 2 into fractions including a treated effluent 3 and a sludge residue 4, usually comprising primary sludge or mixtures of primary and secondary sludges. The treated effluent discharged at 3 may be further processed in tertiary treatment facilities and is usually disinfected and discharged to waste 5 in a conventional manner.

The sludge residue 4 or agricultural sludge 6, or combination thereof, is fed to a comminutor 11 as the input raw material, hereinafter usually referred to as substantially untreated organic sludge, or sludge for further processing in accordance with our invention, schematically shown all inclusively within dotted line area 10.

The sludge is processed in comminutor 11 to reduce the size of the organic solids in the sludge, typically with mechanical shredding or grinding machines as is well-known in the art. Maximum practical size reduction of the solids is advantageous to our process and usually they are comminuted into solids having a reduced size of not substantially in excess of 1/16 inch to ⅛ inch in diameter. Sludge including the reduced solids is discharged from the comminutor at 12 as "comminuted sludge".

The comminuted sludge 12 flows into a disintegrator 14 capable of destroying the particulate structure of organic solids in the sludge by such thorough dispersing action that all parts are made to correspond in structure. Suitable machines are well-known in the art, as discussed in more detail below, and are employed in the chemical industries for the dispersal of solids in fluid solutions and for the preparation of emulsions. Maximum practical size reduction is advantageous to our process and usually the "disintegrated sludge" discharged from the disintegrator at 15 will include particulate matter not exceeding 5 to 10 microns in diameter. However, at least some cellular components present in the comminuted sludge will, due to their strong but flexible membrane structure, pass undamaged through disintegrator 14.

The disintegrated sludge flows into an enzyme hydrolysis reactor 16 into which an inoculum of hydrolytic enzymes is added at 17. In the resultant hydrolytic reaction, contact between the enzymes and the dispersed particulate matter results in the hydrolysis of the latter to low molecular weight particles. Any undispersed cellular components will be degraded by the enzymes, during the initial contact period, to hydrolyze the polysaccharide slime coating constituting the outer cellular layer, thus, to release to solution heavy metal ions occluded thereon, and to attack and weaken the cellulosic wall structure of the cells.

In reactor 16 the incoming disintegrated sludge is converted into a "conditioned sludge" comprising enzyme conditioned cellular components which are susceptible to mechanical disintegration or to disintegration by hydrolysis. Typically, the former is necessary and it is accomplished by rupturing the enzyme conditioned particulate matter in a further disintegrator 19 which may be of the same construction as disintegrator 14. A colloidal slurry including hydrolyzed organic particles is forwarded from the second disintegrator to a second enzyme hydrolysis reactor 18 where the polysaccharide gel content of the particles in the colloidal slurry is hydrolyzed, thereby releasing the cellular constituents to solution and forming a "colloidal suspension" which is discharged from the second reactor.

Although the secondary rupture and hydrolysis of the conditioned sludge released from first hydrolysis reactor 16 is considered necessary in most cases, in instances in which the first disintegrator 14 is sufficiently powerful to rupture all cells, such secondary treatment can be omitted. A principal obstacle to complete cell disintegration in disintegrator 14 is the large forces that must be applied to effect a complete cell rupture in view of their resiliency. Consequently, such an approach would require large amounts of energy and in view of the scarcity and ever increasing cost thereof, this alternative is presently considered economically unfeasible and, therefore, is set forth herein primarily for theoretical completeness rather than practical applicability.

As a further alternative to the above discussed arrangement which employs a secondary disintegrator 19 and a secondary hydrolytic reactor 18, the conditioned sludge released from the first hydrolytic reactor 16 can be recycled through the first disintegrator 14 and the reactor as indicated by dotted line 13. This arrangement has the advantage that only one disintegrator and one hydrolytic reactor is required. However, for most large installations, such as municipal sewage treatment plants, such an arrangement would adversely affect the product flow and would, therefore, not be employed.

Referring still to FIG. 1, the colloidal suspension discharged from reactor 18 is subjected to a heavy metals removal process at 21, preferably employing a chelation reaction that is well-known in the art, to remove from the slurry most of its content of heavy metals. As part of the process of the present invention, such chelation treatment is effective and relatively inexpensive due to the availability of the metals to the chelation reaction as a result of the preceding cell and tissue components disintegration and the hydrolysis of solids to solution and colloidal suspension. A separated, heavy metals concentrate is discharged as a slurry at 22. Additional heavy metal values may be recovered from the effluent from most wastewater treatment facilities. As illustrated in FIG. 1, to accomplish this the treated effluent 3 can be alternatively directed via a conduit 30 to a heavy metals removal unit 31, preferably also employing a chelation process, for the recovery of heavy metals from the effluent. A heavy metals concentrate is discharged at 32, combined with the heavy metals concentrate 22, and discharged at 36 as a valuable side product produced according to the method of our invention.

A demineralized, microparticulate or organic feedstock slurry is discharged from chelating unit 21 at 23 and may be combined via a conduit 34 and a valve 35 with demineralized treated effluent 3 discharged from chelating unit 31 at 33. The combined flows are available at 37 for use as irrigation water with fertilizer and soil amendment materials in colloidal suspension and solution. An auxilliary disinfector 38, usually included in modern wastewater treatment facilities, can be used to meet sterilization requirements for reclaimed wastewaters for irrigation usage. Since practically all solids are in microparticulate form readily available to the sterilization process, less disinfection treatment is required, resulting in treatment cost savings and a relatively low residual of disinfection chemicals in the irrigation fertilizer effluent product discharged at 39.

The resultant nutrient-containing irrigation effluent product of our invention is suitable for pipeline transport as the particulate matter content is dispersed in solution and colloidal suspension having relatively little tendency to precipitation. The product is biologically inactivated; however, the biochemical reactivity potential is high because the solids are dispersed in readily available form.

Additional nitrogen and other valuable agricultural components may be added to the irrigation-fertilizer effluent product of our invention by diverting the organic feedstock slurry 23 via conduit 34 and the appropriately set valve 35 to a shallow solar microalgae reactor pond 40 with open top, exposed to sunlight and into which an inoculum of microalgae is added at 41.

The microalgae proliferates rapidly during a few days time, metabolizing solar energy, atmospheric nitrogen, atmospheric carbon dioxide, and the readily available nutrients in the organic feedstock slurry 23, free of heavy metal toxins which would otherwise inhibit growth. This results in the synthesis of substantial amounts of nitrogen, chlorophyl, and other biomass agricultural nutrients, all of which are valuable agricultural fertilizer components.

A microalgae enriched slurry is discharged from the pond at 42 where it can be combined at 43 with the demineralized effluent 33 and, after disinfection at 38, is discharged as irrigation-fertilizer effluent 39 which is enriched by the added microalgae factors.

Alternatively, the organic feedstock slurry product 23 is uniquely adapted for efficient dewatering at 24 because all solids are in soluble or microparticulate form in which they are more readily separated from water as compared to solids combined with water in the original cellular, fibrous or polysaccharide forms. As is well-known in the art, the latter is most difficult, if not impossible to dewater.

Well-known dewatering devices and technology may be used to separate solids from the water content. These may include the use of organic and inorganic chemicals to induce flocculation, agglomeration, and precipitation of the solids. The dewatering process is completed with centrifuge, vacuum screen, or reverse osmosis filtration machines. The unique conditioning of the raw sludge to facilitate this dewatering step is an important feature of the method of our invention. The filtered effluent removed at 25 from the dewatering unit 24 can be added via a conduit 26 to the effluent 3 discharged from wastewater treatment facility 1.

The dewatering step also yields an organic feedstock concentrate product 27 which can be used in this form as an intermediate material for additional processing into other products, or which can be used locally as a fertilizer soil amendment material. It may also be disposed of by incineration or as landfill.

When stored for later use, the organic feedstock concentrate product 27 is combined with suitable edible acids to inhibit microbiological activity until ready for use. Alternatively, the organic feedstock product 27 can be combined with a suitable sorbent material to inhibit microbiological activity by denial of moisture. These preservative techniques are described in greater detail in our above-referenced co-pending patent application.

The irrigation fertilizer effluent discharged at 39 is a unique product, combining values as irrigation water, fertilizer, and soil amendment materials. When distributed to agricultural lands, the organic materials content is in soluble or microparticulate form suitable for relatively rapid uptake by soil micro-organisms and plants, as contrasted to the more extended time period usually required for bio-degrading the relatively raw and physically large organic solids present in conventional wastewaters and sewage sludges.

About 75% of the total nitrogen content of raw wastewater influent 2 is converted by the process and method of our invention into the equivalent of commercial grade liquid fertilizer. The cellular protoplasm content, from ruptured cells, is particularly valuable as a potent and readily available nutrient for soil micro-organisms and plant life. Substantial amounts of additional fertilizer grade nitrogen can be added by incorporating the solar microalgae pond 40 in treatment of the raw sludge pursuant to our invention. The algae contributes important quantities of biomass fertilizer and, under favorable soil moisture and climatic conditions will continue to grow and synthesize nitrogen, carbon, enzymes, and biological nutrients, which are useful for the stimulation of field crop seed germination and plant growth.

Referring now to FIG. 2, there is illustrated, for example, a system adapted from the one shown in FIG. 1, for processing cattle manure. A modern cattle confinement feedlot 50 is shown which has a concrete floor with multiple, inclined, solid plane surfaces 51, as described in U.S. Pat. No. 3,859,962, issued to Kissinger, and slotted sub-floor drainage channels 52 as described in U.S. Pat. No. 3,898,778 issued to Erickson et al. A pump 53 recirculates an initial quantity of water from a source 54 via a valve 55 and a conduit 56 to multiple slotted subfloor channels 52 to thereby accumulate a manure slurry. The manure slurry has a solids content of about 5 to 25% for beef cattle confined to the floor at a density of about one head per 20 sq. ft. of floor space.

This organic manure slurry is occasionally diverted by the appropriately set valve 55 to a conduit 57 as the input raw material for processing in accordance with our invention, as all inclusively indicated within dotted rectangle 60.

The manure slurry 57, hereinafter again usually referred to as "sludge" is fed through comminutor 61 to reduce the size of organic solids in the sludge as discussed above. A comminuted sludge is discharged at 62 and is sent to a disintegrator 64 to form a disintegrated sludge which has the above discussed characteristics and which is discharged at 65 and then flows into an enzyme hydrolysis reactor 66.

An inoculum of hydrolytic enzymes is added at 67 to initiate the hydrolysis of the particulate matter of the disintegrated sludge. The cellular components in the disintegrated sludge are degraded during their initial period of exposure to the enzymes which facilitates the subsequent rupture of the cellular structure, if necessary, in a secondary disintegrator 69 downstream of reactor 66. In the second disintegrator the particles present in the conditioned sludge received from the reactor 66 are ruptured and disintegrated to form a colloidal slurry which is fed to a second hydrolytic reactor 70 where the polysaccharide gel structure is hydrolyzed as previously described in greater detail.

Since cattle manure usually has a negligible content of heavy metals, the heavy metals removal step previously described can be omitted. Thus, the microparticulate slurry discharged from reactor 70 can be used directly as a liquid fertilizer. Preferably, however, it is first fed to a microalgae pond 80.

An inoculation of microalgae is added to the slurry in the pond at 81. To facilitate rapid photosynthesis and growth of the microalgae, we have found it advantageous to use ponds in which the solids content is maintained at about 2% and the fluid depth is maintained at about 18 inches by adding make-up water 82 from a source 91 as necessary. To minimize algae settling and thermal stratification within the pond it is advantageous to recirculate the algae enriched slurry from a pond outlet 83 via a pump 84, a valve 85 and a conduit 86.

A microalgae enriched liquid fertilizer product obtained in accordance with our invention is withdrawn from pond 80 by appropriately setting valve 85 and flowing it via a one-way check valve 87 into an irrigation water distribution line 90. Irrigation water is supplied, for example, by a well or other source 91 which is separated from the pond outlet line 88 by another check valve 92. Irrigation of field or forage crops can be accomplished by irrigation systems such as described in U.S. Pat. Nos. 3,820,714 or 3,703,990 to Erickson et al., or by any other suitable systems such as the reel-hose irrigation sprinkler 93, well-known in the art.

Feedlot 50, and the source of the manure slurry that is processed in accordance with the embodiment of the invention shown in FIG. 2 may, of course, be a modern confinement dairy or a similar installation, all well-known in the art.

In addition, other agricultural wastes, such as dry manure residues from conventional open type feedlots, manure from other farm animal feeding operations, animal packing house wastes or carcasses, fruit and vegetable packing house wastes, field crop residues, etc., together with water as necessary, may be added at 58, or they may comprise the sole source of sludge fed to comminutor 61.

The comminutor 11 or 61 employed in the process of our invention for conditioning the sludge is well-known in the art, and is commercially available; for instance, Hydraulic Sludge Disintegrator, available from BIF Sanitrol, a unit of General Signal Corp., Largo, Fla.; or, Fryma-Wastewater Mill MA, available from Neumunz, Inc., Leona, N.J.; or the Delumper Brand Size Reduction Equipment available from Franklin Miller, Inc., West Orange, N.J.

The disintegrator (14, 19, 64 or 69) employed in the process of our invention is also well-known and commercially available. Suitable disintegrators include the Dispax-Reactor 3-Stage, inline disperser machines available from the Tekmar Company, Cincinnati, Ohio which have high speed rotor-stator generators to create rotational turbulence, shear and pressure release forces to disintegrate organic particulate matter. Alternative disintegration technologies may be used such as the use of piston-orifice pressure release homogenizer machines or the use of ultrasonic wave energy to dispense solids in slurries, as is well-known in the art.

The enzyme hydrolysis reaction in the reactors employed in the process of our invention can be accomplished in an aqueous slurry, preferably having a 5% to 25% solids content (dryweight basis), buffered to a pH value in the range of 6.5 to 7.2, preferably 7.0, and at a temperature range of between 16°–40° C. and preferably at a temperature in the vicinity of 37° C. The slurry can be recirculated as necessary to keep solids in suspension and accessible to enzymatic reaction. Average stay time to effect the required enzyme hydrolysis reaction is in the range of four to ten hours and treatment facilities can be designed for either batch or flow-through processing.

The hydrolytic enzymes employed can be supplied as an aqueous solution of dehydrated non-specific enzymes prepared as a crude mixture separated from bacterial fermentation broths and subsequently dehydrated. Potency is equal to 50,000 International Units of activity per gram as supplied by Bioferm International, Inc., Medford, N.J. The dried enzymes may be rehydrated in a ratio of 1 lb. to 5 gals. of water, at 37° C. and added into the reactors in the ratio of 1 lb. of dehydrated enzymes per 1000 lbs. (dry-weight) of biodegradable organic material inflow in the sludge to be hydrolyzed. For a typical slurry concentration of 10% solids, about 4 lbs. of dehydrated enzymes are required per 10,000 gals.

Hydrolytic enzymes useful for the purposes of this invention includes:
Carboxylic Ester Hydrolases
Thiolester Hydrolases
Phosphoric Monoester Hydrolases Phosphoric Diester Hydrolases
Triphosphoric Monoester Hydrolases
Sulphuric Ester Hydrolases
Diphosphoric Monoester Hydrolases
O-Glycosyl Hydrolases
N-Glycosyl Hydrolases
S-Glycosyl Hydrolases
Thioether Hydrolases
Ether Hydrolases
α-Aminoacylpeptide Hydrolases
Peptidylamino Acid Hydrolases
Dipeptide Hydrolases
Dipeptidylpeptide Hydrolases
Peptidyldipeptide Hydrolases
Serine Proteinases
SH Proteinases
Acid Proteinases
Metallo Proteinases
Linear Amide Hydrolases
Cyclic Amide Hydrolases
Linear Amidine Hydrolases
Cyclic Amidine Hydrolases
Nitrile Hydrolases
Acid Anhydride Hydrolases
Sulphonyl Anhydride Hydrolases
Carbon-Carbon Hydrolases
Organic Halide Hydrolases For protection and conservation of the sensitive and valuable protoplasm content of the cells we do not employ nuclease enzymes and limit the Enzyme Hydrolysis reaction to about 12 hours maximum.

For large volume installations, a concentrate of dehydrated, viable, hydrolytic enzyme-producing micro-organisms may be employed. Potency is about 5 billion viable micro-organisms per gram as supplied by Bioferm International, Inc., Medford, N.J. Each pound of this inoculant may be cultured in 50 gallons of water, at about 37° C., to which is added 5% to 7% by volume of beet or cane molasses, or an equivalent source of sugar and minerals, and sufficient urea or an equivalent source of nitrogen to establish approximately a 10:1 carbon to nitrogen ratio. The pH value is adjusted to the 6.8/7.2 range, optimum is 7.0, and air is diffused into the recirculating slurry at the rate of about 130 cfm per 1000 gals. In about 18-24 hours, the finished liquid culture will have a concentration of about 1 billion micro-organisms per milliliter.

About 90% of each batch may be used as the inoculant added into the enzyme hydrolysis reactor at the rate of about 50 gals. per 1000 gals. of sludge slurry (10% solids). Such cultures should be used within 12 hours of preparation and preferably should be biologically inactivated by preconditioning to disintegrate cellular structure using a mechanical disperser or homogenizer machine as described with reference to the disintegrator in the process of our invention. Alternatively, the hydrolytic enzyme inoculant may be introduced and dispersed into process by addition to the slurry inflow to the disintegrator step of our invention.

Ten percent of each batch may be used as the inoculant for subsequent culture batches up to a total of about six such extension cultures, after which a new series of cultures should be started with a fresh supply of dehydrated micro-organisms as the initial inoculant. Thus, in large installations, enzyme inoculant may be produced economically on site from relatively small amounts of commercially produced concentrates of dehydrated enzyme producing micro-organisms.

Enzyme-producing micro-organisms useful for the purposes of this invention include:

| | | |
|---|---|---|
| Alternario sp. | Bacillus sp. | Acremonium sp. |
| Arthrobotrys sp. | Achromobacter sp. | Memnoniella sp. |
| Botrystis sp. | Arthrobacter sp. | Monascus sp. |
| Cephalosporium sp. | Corynebacterium sp. | Mucor sp. |
| Chaetomium sp. | Cellulomonas sp. | Mortierella sp. |
| Chloridium sp. | Micrococcus sp. | Myrothecium sp. |
| Chrysosporium sp. | Streptomyces sp. | Paecilomyces sp. |
| Cladosporium sp. | Desulphovibrio sp. | Penicillium sp. |
| Conidiobolus sp. | Micromonospora sp. | Polyporus sp. |
| Endothia sp. | Pseudomonas sp. | Preussia sp. |
| Entomophthora sp. | Nocardia sp. | Pythium sp. |
| Eupenicillium sp. | Mycobacterium sp. | Rhizopus sp. |
| Fomes sp. | Thermoactinomyces sp. | Sporoboromyces sp. |
| Fusarium sp. | Thermomonospora sp. | Stachybotrys sp. |
| Gliocladium sp. | Thermopolyspora sp. | Trichoderma sp. |
| Gliomastix sp. | Xanthomonas sp. | Verticillum sp. |
| Humicola sp. | Aspergillus sp. | |

The Heavy Metals Removal process of our invention is efficiently accomplished as a result of the reduction of solids to microparticulate hydrolyzed condition in the prior comminution, disintegration, and enzyme hydrolysis steps of our invention. A suitable metals removal method is described by Wing et al in U.S. Pat. No. 3,978,286. This method employs the chelating capacity of insoluble cross-linked starch xanthates to remove heavy metals in an aqueous solution by contact absorption. Suitable insoluble cross-linked starch xanthate material is available in granular or prill form from Bioferm International, Medford, N.J. The pH value of the slurry inflow to the Heavy Metals Removal reactor may be in the range of 3.0 to 11.0, preferably 7.0 to 8.0 for maximum heavy metals removal efficiency.

Extraction of the heavy metal bearing chelating material may be accomplished by precipitation, centrifugation or filtration. The retained accumulated metallic ions can be released, and the chelate material regenerated, by occassional backwashing with a dilute acid solution. The metals may be separated from the acid solution by exchange resin bed technology and discharged as a water base slurry containing the heavy metal ions in solution and suspension. This slurry may be further processed and refined for the recovery of individual metal values. Such techniques are well-known in the art and are described in more detail in our referenced U.S. patent.

EXAMPLE

A 5 gal. sample of mixed primary and secondary sludge was obtained from a sewage wastewater treatment facility and was processed according to the method of our invention through a laboratory grinder-comminutor, followed by disintegrator processing for about 10 mins. using a Tekmar Super Dispax SD 65 Disperser. Hydrolytic enzyme conditioning of cellular components was accomplished in 90 mins. after addition of an enzyme solution prepared as described above, to a slurry having about 10% solids content and adjusted to pH 7.0 and a temperature of 37° C. The conditioned sludge was recycled through the disintegrator-disperser and thereafter the enzymatic hydrolysis was continued and completed in eight hours to effect the above-described secondary disintegration and hydrolytic treatment of the conditioned sludge and thereby convert it into a microparticulate slurry. The microparticulate slurry was processed for removal of heavy metals in an improved chelation process adopted from the process described by Wing et al in U.S. Pat. No. 3,978,286. Seven hundred fifty mg of ISX-733 insoluble starch xanthate was used per unit volume of sludge having a non-organic ash content of 1000 mg per unit volume. Simple precipitation was used to remove the heavy metal bearing chelate. The results of spectrographic testing for some heavy metals in the microparticulate slurry as compared to the resultant demineralized feedstock slurry were found to be:

| Element | Pre-Treatment mg/kg - ppm | Post-Treatment mg/kg - ppm | Reduction % |
|---|---|---|---|
| Silver | 411 | 32.8 | 92.0 |
| Gold | 39 | 7.4 | 81.0 |
| Iron | 11,740 | 62.0 | 99.5 |
| Copper | 2,200 | 220.0 | 90.0 |
| Manganese | 1,310 | 150.0 | 88.5 |
| Zinc | 3,820 | 191.0 | 95.0 |
| Chromium | 3,260 | 270.0 | 91.7 |
| Lead | 210 | 26.0 | 87.6 |
| Nickel | 6,250 | 440.0 | 93.0 |
| Cadmium | 830 | 70.0 | 91.6 |

An alternative process for removing heavy metal ions in aqueous solutions is described by Joshiaki Kajyama in U.S. Pat. No. 3,890,225, wherein adsorption by coral fossil limestone in granular form is employed. As in the case with the Wing et al process, and in all other ion removal processes known to us, such processing is not effective for the removal of the heavy metal ions contained within the biological cells and the cellulosic tissue structure of much of the biomass of organic sludges. In the improved process and method of our invention, such metal ions are effectively separated by chelation treatment because the prior disintegration and enzyme hydrolysis to a low molecular weight slurry serves to make the metal ion content readily accessible to removal processing in our method. Other alternative processing methods for heavy ion removal may be employed without departing from the scope of the process and method of our invention.

For installations in which the input substantially untreated organic sludge is from agricultural sources containing insignificant amounts of heavy metals, the heavy metals removal step may, of course, be omitted.

The dewatering step may be accomplished in accordance with any of the techniques well-known in the art. For example, the incoming slurry may be preconditioned with flocculant chemicals dispersed into solution, followed by mechanical processing to remove water from the precipitate. Reverse osmosis filtration technology may be used for dewatering, and suitable equipment therefore is available from Amicon Corporation, Cambridge, Mass. Alternatively, centrifuge, vacuum screen or other filtration machines may be used. Following is a listing of some suitable flocculating chemicals:

| Organic | Inorganic |
|---|---|
| Fulvo-Humic Acids | Aluminum Chloride |
| Chitosan | Ferric Chloride |
| Acrylic Copolymers | Phosphomolybdic Acid |
| Aromatic Resin Copolymers | |
| Aliphatic Resin Copolymers | |
| Polymeric Aliphatic Amines | |
| Polymeric Aliphatic Acids | |
| Polymeric Aromatic Amines | |
| Polymeric Aromatic Acids | |

The solar microalgae ponds employed in the process of our invention should provide for a slurry depth of 30 to 50 centimeters, and they should be of a size sufficient to accommodate the desired organic feedstock slurry diluted to about 2% solids. The pH should be corrected, if necessary, to the range of 6.8 to 7.5, preferably 7.2. A means for mixing and recirculating, e.g. the above described pump recirculation, should be provided to minimize algae settling and thermal stratification.

The microalgae inoculant is available from Bioferm International, Medford, N.J., as a dehydrated concentrate having a potency of one billion to five billion dehydrated microscopic aquatic plants per gram as microalgae and photosynthetic bacteria.

The dried microalgae may be rehydrated in a ratio of 1 lb. to 5 gals. of water at 37 C., and added to the solar-microalgae pond in the ratio of 1 lb. of microalgae per 100,000 lbs. dryweight of agricultural nutrients in solution.

Families of microalgae and photosynthetic bacteria useful for the purposes of this invention include:

| Algae | Photosynthetic Bacteria |
|---|---|
| Chlorophyceae | Chlorobioceae |
| Euglenophyceae | Thiorhodaceae |
| Xanthophyceae | Athiorhodaceae |
| Chrysophyceae | |
| Bacillariophyceae | |
| Phaeophyceae | |
| Dinophyceae | |
| Cyanophyceae | |
| Rhodophyceae | |
| Cryptophyceae | |
| Chloromonadales | |

Upon discharge to agricultural field use, about 5% of the microalgae culture product may be retained in the solar pond to serve as the inoculant for the next inflow of organic feedstock nutrient slurry and water for the necessary dilution.

Although the foregoing improved method for our Sludge-Energy Recycling Method has been described in some detail by way of illustration and example for purposes of clarity and understanding, it is to be understood that certain changes, modifications and omissions may be practised within the spirit of the invention as limited only by the scope of the appended claims.

We claim:

1. A method for converting substantially untreated organic sludge into a useful substance comprising the steps of disintegrating organic solids in the sludge into organic particulate matter; thereafter hydrolyzing the particulate matter in the sludge by adding thereto at least one of hydrolytic enzymes and hydrolytic enzyme-producing micro-organisms and holding the particulate matter; rupturing the hydrolyzed particulate matter to form a colloidal slurry and thereafter using the slurry.

2. A method according to claim 1 wherein the step of disintegrating comprises the step of comminuting the organic solids in the sludge into reduced size solids, and thereafter disintegrating the reduced size solids into particulate matter prior to the step of hydrolyzing.

3. A method according to claim 1 including the step of further hydrolyzing the colloidal slurry prior to the step of using to thereby form a colloidal suspension.

4. A method according to claim 3 including the step of contacting the suspension with a metal chelating substrate prior to the step of using to remove heavy metals from the suspension.

5. A method according to claim 3 wherein the sludge is obtained from a wastewater treatment facility which also releases an effluent, and including the step of combining the colloidal suspension with the effluent into a liquid fertilizer comprising the end product.

6. A method according to claim 5 including the step of removing heavy metals from the suspension and from the effluent.

7. A method according to claim 3 including the step of inoculating the suspension with microalgae, exposing the inoculated suspension to sunlight, whereby the microalgae in the inoculated suspension metabolizes solar energy, atmospheric nitrogen and atmospheric carbon dioxide and nutrients in the suspension and thereby synthesizes nitrogen and chlorophyl and thus forms a nitrogen enriched, liquid fertilizer product.

8. A method according to claim 3 wherein the step of using comprises the steps of using the suspension as a liquid fertilizer.

9. A method according to claim 3 including the steps of separating the suspension into an effluent and a moist product prior to the step of using.

10. A method according to claim 9 including the step of adding to the moist product an edible acid in an amount sufficient to inhibit microbial and pathogenic activity during storage and transport of the product.

11. A method according to claim 10 including the step of utilizing the acidified product as fertilizer.

12. A method according to claim 10 including the step of utilizing the acidified product as a feed supplement.

13. A method according to claim 9 including the step of adding to the product a sufficient amount of a sorbent material to reduce the moisture content of the product to a level of which bacterial and pathogenic activity is inhibited during storage and transport of the product.

14. A method according to claim 13 including the step of using the product including the sorbent material as a fertilizer.

15. A method according to claim 13 including the step of using the product including the sorbent material as a feed supplement.

16. A method according to claim 1 wherein the sludge comprises untreated sludge residue from a wastewater treatment plant.

17. A method according to claim 16 wherein the sludge further includes biologically treated sludge from a wastewater treatment plant.

18. A method according to claim 1 wherein the sludge includes untreated animal manure.

19. A method according to claim 16 or 18 wherein the sludge further includes untreated agricultural waste.

20. A method for converting substantially untreated organic sludge into a useful substance comprising the steps of disintegrating organic solids in the sludge into particulate matter including viable organic cells to thereby form a disintegrated sludge; thereafter adding to the disintegrated sludge a substance capable of providing hydrolytic enzymes; holding the disintegrated sludge including the enzymes for a sufficient length of time to hydrolyze the particulate matter; thereafter rupturing the particulate matter to form a colloidal slurry; hydrolyzing the slurry to form a colloidal suspension; and thereafter using the suspension.

21. A method according to claim 20 including the step of removing heavy metals from the suspension.

22. A method according to claims 20 or 21, including the steps of providing a solar pond, placing the suspension in the pond, adding microalgae to the suspension in the pond, thereafter subjecting the suspension in the pond, including the microalgae, to sunlight so that the microalgae in the suspension forms a nitrogen enriched, liquid fertilizer product, and thereafter withdrawing the liquid fertilizer product from the pond.

23. A method according to claim 22 including the step of limiting the depth of the suspension in the pond to about 18 inches.

24. A method according to claim 23 including the step of agitating the suspension in the pond during the subjecting step to prevent a settling of the microalgae in the pond and thermal stratification within the pond.

25. A method according to claim 24 wherein the agitating step comprises the step of circulating the suspension between different locations of the pond.

26. A method according to claim 20 wherein the step of adding a substance comprises adding hydrolytic enzymes to the sludge.

27. A method according to claim 20 wherein the step of adding the substance comprises adding hydrolytic enzyme-producing micro-organisms to the sludge.

28. A method for converting substantially untreated organic sludge from a wastewater treatment plant into a useful product comprising the steps of collecting a sludge residue from the plant; disintegrating organic solids in the sludge to form a disintegrated sludge including particulate matter; thereafter hydrolyzing the particulate matter in the disintegrated sludge by adding thereto a substance capable of providing hydrolytic enzymes; holding the disintegrated sludge, including the enzymes, for a sufficient length of time to hydrolyze the particulate matter; thereafter rupturing the particulate matter to form a colloidal slurry; further hydrolyzing the slurry to form a colloidal suspension; removing heavy metals from the suspension; treating the suspension to form therefrom the product; and using the product.

29. A method according to claim 28 including the step of separating the waste water into an effluent and the sludge, and wherein the step of treating comprises combining at least portions of the effluent and of the suspension.

30. A method according to claim 29 including the step of removing heavy metals from the effluent and from the suspension.

31. A method according to claim 30 wherein the step of using comprises using the combined effluent and suspension as a liquid fertilizer.

32. A method according to claim 29 wherein the step of treating further comprises separating the suspension into a moist product and a filtered liquid, and wherein the step of combining further comprises combining the effluent and the filtered liquid.

33. A method according to claim 29 including the step of removing heavy metals from the effluent, and wherein the step of combining comprises combining heavy metals removed from the suspension and heavy metals removed from the effluent.

34. A method according to claim 28 wherein the step of treating comprises enriching the suspension with nitrogen by adding to the suspension microalgae, exposing the suspension including the microalgae to sunlight for a sufficient time to permit the microalgae to synthesize solar energy, atmospheric nitrogen, atmospheric carbon dioxide and nutrients present in the suspension into nitrogen and chlorophyl; and wherein the step of using comprises using the enriched suspension as a liquid fertilizer product.

35. A method according to claim 28 including the step of adding to the sludge, agricultural waste products.

36. A method for converting an substantially untreated organic sludge including raw animal manure into a useful product comprising the steps of disintegrating organic solids in the sludge to form a disintegrated sludge including particulate matter; thereafter hydrolyzing the particulate matter in the disintegrated sludge by adding thereto a substance capable of providing hydrolytic enzymes; holding the disintegrated sludge, including the enzymes, for a sufficient length of time to hydrolyze the particulate matter; thereafter rupturing the particulate matter to form a colloidal slurry; further hydrolyzing the slurry to form a colloidal suspension; treating the suspension to form therefrom the product; and using the product.

37. A method according to claim 36 wherein the step of treating comprises the step of enriching the suspension with nitrogen by adding to the suspension microalgae, exposing the suspension including the microalgae to sunlight for a sufficient time to permit the microalgae to synthesize solar energy, atmospheric nitrogen, atmospheric carbon dioxide and nutrients present in the suspension into nitrogen and chlorophyl; and wherein the step of using comprises using the enriched suspension as a liquid fertilizer product.

38. A method according to claim 36 including the step of adding to the raw sludge raw agricultural waste products.

* * * * *